Feb. 14, 1967    J. O. HUFF    3,303,933
REINFORCED FILTER WITH REPLACEABLE CARTRIDGE
Filed July 23, 1963    2 Sheets-Sheet 2
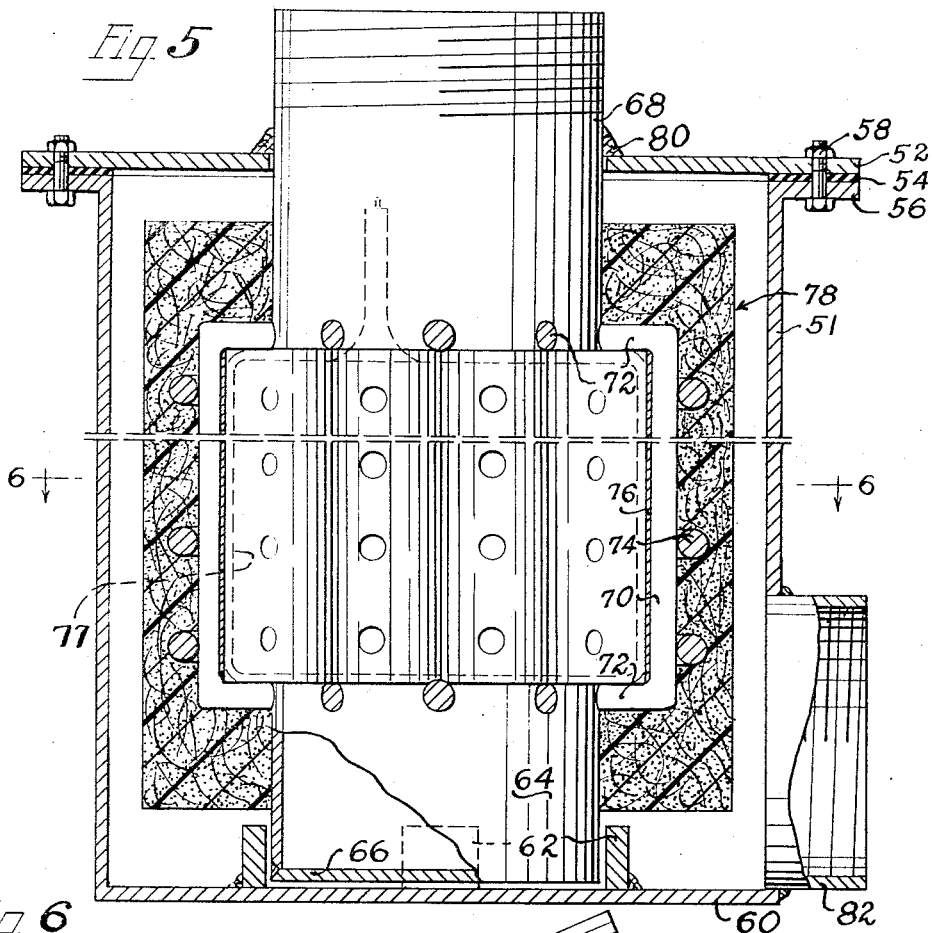
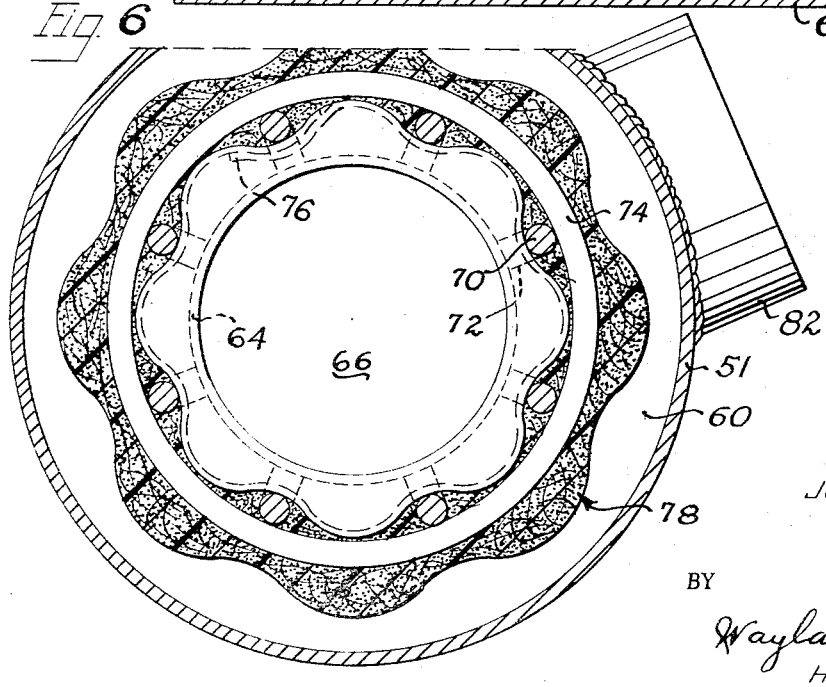
JON O. HUFF
INVENTOR.
BY
Wayland D. Keith
HIS AGENT

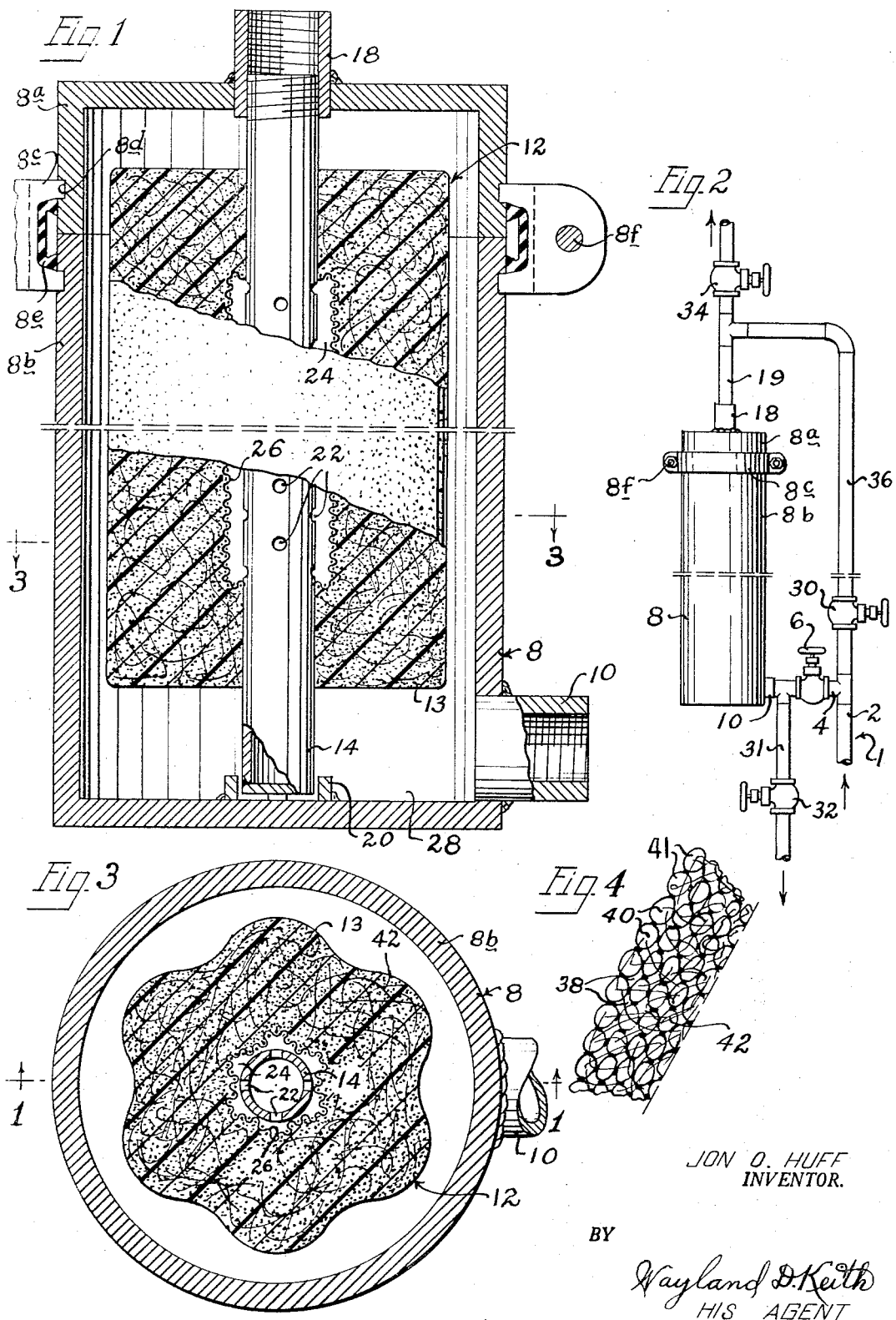

United States Patent Office 3,303,933
Patented Feb. 14, 1967

3,303,933
REINFORCED FILTER WITH REPLACEABLE CARTRIDGE
Jon O. Huff, P.O. Box 235, Wichita Falls, Tex. 76307
Filed July 23, 1963, Ser. No. 297,032
2 Claims. (Cl. 210—441)

This invention relates to improvements in filters and more particularly to water filters for filtering solids from water as the water flows therethrough.

In the water flooding of oil sands to create a water drive in the oil formations to cause the oil within the formation to flow towards an oil outlet well, it is necessary for water, preferably salt water, free of mud and impurities, to be forced into the oil producing strata under pressure, so as to enable the water to be directed into the oil producing formation without clogging the formation with foreign substance.

Various methods have been proposed for filtering foreign substance from large volumes of salt water to enable the water flooding of oil bearing formations, however, many system will filter the foreign substance from the salt water, or other waters, for an indeterminate time, and then the filter will become clogged to such an extent that the filter has to be discarded and a new filter installed.

The present filter is of a character that will filter the foreign substance from the water passing therethrough, as the water is being pumped from a water supply through a pipeline into the well tubing which leads to the bottom of the well, which filter is of such capacity as to filter the foreign substance from the salt water until such time as the filter becomes saturated with foreign substance, at which time provision is made for reversing the flow of the water through the filter temporarily, which will backwash the foreign substance from the pores of the filter to restore its effectiveness to normal or substantially so.

An object of the invention is to provide a filter for filtering foreign substance from water, salt water, and from other liquids, in such manner that the water passing therethrough may be pumped into an oil producing strata without the oil bearing strata becoming clogged with foreign substance.

Another object of the invention is to provide a filter that may be readily connected within a pipe line which leads from a source of salt water supply to a well, so the salt water, or the like, may be pumped through the filter at high pressure and into the oil bearing formation in the well.

Still another object of the invention is to provide a filter which may be backwashed so as to remove the sediment therefrom quickly and effectively. The water is then redirected through the system to perform the filtration of the water being directed into the oil bearing formation.

Yet another object of the invention is to provide a filter which lends itself to mass production, which is inexpensive to produce, which is easy to install and to use, and which may be reconditioned to extend the usefulness thereof.

A further object of the invention is to provide a filter which may be made in a minimum of time, and, when constructed and properly cured, has a tensile strength which approaches or is greater than that of steel, and which, when properly used and cleaned, will last over a period of years.

A still further object of the invention is to provide a filter of high impact strength and of high flexureal strength.

Still another object of the invention is to provide a filter which is constructed of sand, epoxy resin, fiberglass and steel reinforcing which may be readily processed and 98% cured, within seven to nine minutes, and still withstand 400 to 600 pounds pipeline pressure to enable the filtering of a maximum amount of salt water, water, or other liquid.

A final object of the invention is to provide a filter of greater filtering surface than is possible in a cylindrical filter.

With these objects in mind and others which will become manifest as the description proceeds, reference is to be had to the accompanying drawing in which like reference characters designate like parts in the several views thereof, in which:

FIG. 1 is a longitudinal view through the filter, taken on the line 1—1 of FIG. 3, looking in the direction indicated by the arrows, with parts broken away and shortened and with parts shown in elevation to bring out the details of construction;

FIG. 2 is an elevational view of the filter installed within a pipeline system in such manner that it may be backwashed by reversing the flow of water therethrough in such manner as to cleanse the foreign substance therefrom;

FIG. 3 is a sectional view taken on the line 3—3 of FIG. 1, looking in the direction indicated by the arrows;

FIG. 4 is a greatly magnified, fragmentary view of the filter element, showing the sand, the voids formed between the granules of sand, the resin which bonds the adjacent surfaces of the sand granules, and showing fiberglass intertwined therebetween and bonded thereto;

FIG. 5 is a longitudinal, sectional view similar to FIG. 1, but of a modified form of the invention; and FIG. 6 is a sectional view taken on the line 6—6 of FIG. 5, looking in the direction indicated by the arrows.

With more detailed reference to the drawing, the numeral 1 designates generally a pipe line system such as used for directing salt water from a supply source into oil bearing formations or for directing water or other liquids to be filtered through the system in such manner that extraneous substance may be removed therefrom before the salt water, or the like, is forced into an oil bearing formation when the formation is being treated, as by water flooding, to cause the formation to give up additional oil, in a manner well known in the art of oil production. The numeral 2 designates the inlet pipe which normally connects with a branch pipe 4 which leads through a valve 6 into the lower end of a cylindrical filter housing 8. The cylindrical filter housing 8 has a screw threaded coupling 10 secured thereto on a side near the bottom thereof, which coupling 10 is in fluid communication with the interior of housing 8. A filter cartridge, designated generally by the numeral 12, is mounted centrally of cylindrical filter housing 8 on a perforate, longitudinal pipe 14, the upper end of which pipe 14 is screw threaded into a coupling 18. The other end of coupling 18 has a pipe 19 connected thereto. The lower end of pipe 14 is positioned between lugs 20 on the inner face of the bottom of housing 8, which lugs maintain pipe 14 in axially aligned position with respect to cylindrical filter housing 8. The pipe 14 has perforations 22 formed therein within the hollow opening 24 of the filter cartridge 12. The filter cartridge 12, on pipe 14, is made of sand, resin, and fiberglass, as will be more fully brought out hereinafter. The body 13 of filter cartridge 12 is corrugated, both exteriorly and interiorly, as will best be seen in FIG. 3, in such manner that the wall thickness is approximately uniform.

The interior of the filter is maintained in a corrugated form by a corrugated, peforate metal mesh or screen 26, which maintains the material from which the filter cartridge 12 is made in spaced relation with respect to pipe 14 for a portion of the length thereof, during the molding process thereof. The cylindrical filter housing 8 completely surrounds the filter cartridge 12 so that foreign matter may be filtered out on all surfaces thereof, and the side surfaces are corrugated longitudinally to give approximatey 21 percent greater filtering area than if the filter were cylindrical.

Pipes 4 and 19 connect to the respective couplings 10 and 18 to normally form an inlet and an outlet, respectively, for the passage of water into and out of cylindrical housing 8. A branch pipe 36 conects between pipe 2 and pipe 19 to form a passage to enable the back washing of the filter, as will be brought out more in detail hereinafter. A valve 30 is provided within the length of pipe 36 and a valve 34 is provided within pipe 19 outwardly from the juncture with pipe 36, to control the flow of water through the respective portions of the respective pipes. A valve 32 is provided within the length of pipe 31, the purpose of which will be more fully brought out hereinafter.

To direct water through the filter from a source of water supply, to which inlet pipe 2 is connected, valve 6, in pipe 4, is opened, as is valve 34 in pipe 19, and valves 30 and 32 in the respective pipes 36 and 31 are closed, which will direct water from inlet pipe 2 through pipe 4 into cylindrical filter housing 8 and into annular and longitudinal spaces which surround filter cartridge 12, and through the porous body 13 of the filter cartridge 12 into the hollow opening 24 therein. The water will pass from hollow opening 24 into perforations 22 in pipes 14, thence upward through pipe 14 and out through coupling 18 into pipe 19 and out through valve 34 to the place where the filtered water is to be used.

When the filter cartridge 12 becomes so impregnated with foreign substance filtered from the water as to be impermeable, the efficiency thereof is impaired. Whereupon, the porous filter cartridge is cleansed in the following manner. The valves 30 and 32 are opened and valves 6 and 34 are closed, which will direct water or other liquid from inlet pipe 2 through branch pipe 36, through pipe coupling 18 into axial pipe 14, thence outward through perforations 22 into hollow opening 24 which surrounds the perforate portion of pipe 14, then upon applying hydraulic pressure on pipe 14, the water, or other liquid, will be forced outward through the walls of filter cartridge 12 and through the pores of the filter into the annular space within cylindrical filter housing 8, which will wash the foreign substance and debris from the interstices 38 between the granules of sand 40, and the fluid will flow out between the granules of sand 40 and through the strands of fiberglass 42 into the sediment chamber 28, which is provided in the lower end of cylindrical filter housing 8, thence out through pipe 31 and open valve 32 to a place of disposal.

In mixing epoxy resin 41, or other suitable plastic, with sand granules 40 and fiberglass 42, the resin will form bonds between adjacent granules of sand to bond sand to sand, and with the fiberglass coated with resin, this will be bonded to the sand in the manner as illustrated in FIG. 4, however, with heated air being passed therethrough the interstices 38 between the granules of sand and fiberglass will remain open so as to give a permeable cellular arrangement therebetween. The size of the interstices will be proportionate to the size of the sand granules 40, and the amount of fiberglass and the quantity of resin, with in limits, used to bond the granules together.

The fiberglass 42, when mixed with epoxy resin, or other plastic bonding agent, becomes bonded to the granules of sand 40 with which the substance is intermixed and forms a bond of extreme strength, as the fiberglass has a rated tensile strength of 225,000 to 300,000 pounds per square inch. Epoxy resin has a strength of aproximately 15,500 pounds per square inch and an equivalent weight of 174 to 185 pounds, which epoxy resin has a gel time, at normal temperature, of 45 minutes to an hour and a half, that is, at temperatures of 80 degrees to 60 degrees, respectively, which enables the epoxy resin to be mixed with granules of sand 40 and fiberglass 42 and poured into molds to mold the elongated, corrugated filter cartridge 12 around the axial pipe 14. The amount of sand, of epoxy resin and of fiberglass may be varied in accordance with the degree of filtration desired; however, the sand can be varied from 68% to 91% of the total, the resin can be varied from 7% to 12% of the total, and the fiberglass can be varied from 2% to 20% of the total, which percentages are calculated by the weight of the respective materials, and the size of the granules of sand may be such as to pass through a 30 mesh screen, or the size of the granules of sand may vary from 50% finer to 50% coarser at a degree of purification of the liquid required. For most uses, it is preferable to use sand which will pass through 30 to 40 mesh screen, and in the proportion of 87.5% sand, 9.5% resin, and 3% fibergass by weight, with the sand and fiberglass being thoroughly mixed, whereupon the liquid resin, preferably epoxy resin, is added to the mixture and the mixing continued until a homogenous mass, which is of a consistency to pour, is had, and with the pipe 14 properly placed within the mold, and with a screen or metal mesh 26 defining a hollow opening 24 around the perforate portion of the pipe 14, the mixture, while in the fluid state, is poured around the pipe 14 and mesh 26 until the mold is filled, then pressure in an amount of from 2 pounds to 50 pounds can be applied, which will cause the material to be thoroughly compacted, and with a hot air conduit connected to axial pipe 14, heated air is directed through the pipe 14 and out through perforations 22 until the epoxy resin is set sufficiently to enable the removal of the filter unit from the mold. It is preferable to have the air heated to approximately 145 degrees F., and with a pressure of approximately four pounds per square inch. In this manner an open cell filter is created, whereupon, the filter unit is removed from the mold and placed in an oven to bake at a temperature of 150 degrees F. for approximately six hours. This baking process effects a 98% to 99% curing of the epoxy resin within the filter unit, and within one or two days, at normal temperature, the epoxy resin becomes approximately 100% cured and the unit is ready for insertion into the cylindrical filter housing 8 for placing within a pipe line system 1.

The cylindrical filter housing 8 is made of separable units 8a and 8b which are held together in fluid tight relation by a pair of semi-annular bands 8c, which bands 8c are secured together as by bolts 8f. The bands 8c engage within grooves 8d formed in the exterior of the respective units 8a and 8b to hold these units against separation and to retain pressure. A sealing gasket 8e is provided to form a seal between the top unit 8a and the bottom unit 8b, when the semi-annular bands 8c are in place.

MODIFIED FORM OF INVENTION

The form of the invention, as illustrated in FIGS. 5 and 6, shows a modified form of filter which may be constructed of greater size and of greater capacity than the aforementioned form of filter, as the present form of filter has bars of reinforcing steel therein.

The modified form of invention is utilized in a pipe line system, and is connected thereinto in substantially the same manner as the arrangement disclosed in FIG. 2, however, the method of forming the present form of the device is different from the manner of forming the aforementioned form of filter.

The modified form of filter has a casing 51 which is closed with an apertured head or cover 52. A gasket 54 is interposed between the head 52 and the out-turned, apertured flange 56 on casing 51 to form a fluid tight seal. Bolts 58 pass through the apertures of flange 56 and through the apertures in cover or head 52 to hold the cover in fluid tight relation with respect to the casing 51.

It is preferable to have the lower end 60 of casing 51 made integral therewith or secured in place by welding or the like. A plurality of upstanding lugs 62 are secured to the inner face of the lower end 60 of the casing 51 and are spaced from the center thereof to receive axial pipe 64 in guided relation and to support the pipe 64 against lateral movement. The lower end of the pipe 64 is closed, as indicated at 66. A second pipe 68 is spaced longitudinally from the inner end of pipe 64, and is held in spaced apart relation with respect thereto by reinforcing rods 70, each of which rods 70 has inturned ends 72 which are welded, or otherwise secured, to the adjacent ends of pipes 64 and 68 in such manner as to form an enlarged cage between the adjacent ends of pipes 64 and 68. Longitudinally spaced apart reinforcing rings 74 surround circumferentially spaced rods 70 and are welded thereto to form bracing therefor.

Sand, fiberglass and resin, such as epoxy resin, are mixed in the manner set forth for the above described form of invention. A lineal, perforate, corrugated sheet of metal is formed into a cylinder, as indicated at 76, which is passed through pipe 68, and is fitted within the enlarged cage formed by bars 70 and 74 between the ends of pipes 64 and 68, which cylinder is substantially the same length as the cage. The corrugations of the metal cylinder are so arranged that the rods 70 will be received in the respective valleys thereof, with the ridges of the corrugations being substantially in contact relation with the rings 74. The pipes 64 and 68, with the reinforcing rod arrangement, as outlined above, are placed within the corrugated mold so that the corrugations of the mold will be complementary to the corrugations of the metal cylinder within the cage formed by rods 70 and 72 and rings 74. With the lineal, perforate cylindrical sheet of metal fitted within the enlarged cage formed between the ends of pipes 64 and 68, as set out above, an inflatable air bag 77, of the general character used in the repair of automobile casings by vulcanizing, is inserted into the cylinder and inflated, and is maintained in inflated condition to hold the sheet metal cylinder in place. With the corrugations thus arranged, a substantially uniform annular void, with reinforcing members therein, will be formed between the wall of the mold and the inner corrugated sheet metal cylinder form, designated 76, into which void the mass which forms the filter unit, designated at 78, is poured. When the pipes 64 and 68 and the reinforcing members 70, 72, and 74 are assembled and properly placed in the mold, the mold is filled with the mixture of sand, fiberglass and resin in the manner set out for the above mentioned form of invention, to form the filter unit 78, which is then allowed to harden or set for the required length of time. The unit is then baked to effect a substantially complete setting of the resin.

The curing of the filter cartridge having been completed, the corrugated metal cylinder 76 is removed by a workman placing a hand through pipe 68 into the enlarged opening formed between reinforcing bars 70, whereupon, the end of the corrugated metal is raised and the sheet is coiled inwardly until the metal will pass out through the opening in the end of pipe 68.

With the filter cartridge, designated generally at 78, cured, the cover or head 52 is secured to the pipe 68, as by welding as indicated at 80, or by other suitable means. The filter cartridge unit is then fitted within casing 51, and the fluid to be filtered is passed through inlet opening 82, thence through the wall of the filter cartridge 78 to the interior of the filter, thence upward through pipe 68 to the place of use.

By having the wall of the filter cartridge 78 of uniform thickness, and of a material made up of said epoxy resin and reinforced with fiberglass and steel rods, the epoxy resin having been cured by hot air being forced therethrough at a temperature as set forth in the above described form of invention, and at a pressure of at least four pounds per square inch, a filter is produced which will effectively filter extraneous solids from the water, or other liquid, being passed therethrough until such time as the interstices of the filter wall become filled with sediment to the extent that the filtering action is retarded. At such time, the flow of liquid through the filter may be reversed in the manner set out above, so as to wash the filter free of accumulated solids, which accumulation is disposed of through pipe 31, in the manner set out above. When the filter cartridge is cleansed, the flow of fluid therethrough may again be reversed, and directed therethrough in the normal manner to continue the filtering until such time as the cleaning needs to be repeated, which may be a long period of time, depending upon the purity of the liquid being filtered. The process of cleaning the filter may be repeated many times.

By having the corrugations arranged in the manner set out, the filtering surface area is increased at least 21% over the same size filter housing that would be required for a cylindrical filter.

It is to be understood that the filter unit can be made in any size as to diameter and as to length, to accommodate the volume of liquid to be passed therethrough and the amount of filtrate to be removed from the liquid being filtered.

Having thus clearly shown and described the invention what is claimed as new and desired to be secured by Letters Patent is:

1. A filter for filtering unwanted particles from liquid as the liquid flows therethrough, which filter comprises:
   (a) a hollow casing having a top and bottom wall,
      (1) said hollow casing having an inlet opening formed by a pipe coupling secured therein,
      (2) said hollow casing having an outlet opening formed by a pipe coupling secured to said top wall,
   (b) a pipe extending from said outlet coupling into said casing, which pipe has a closed inner end secured to said bottom wall,
      (1) said pipe having lateral openings formed therein for a portion of the length thereof intermediate the length of said pipe,,
   (c) a filter mass surrounding said pipe and having a corrugated inner hollow portion receiving said lateral openings within the length thereof and a corrugated outer portion,
      (1) said filter comprising a mixture of sand, fiberglass, bonded together by epoxy resin so as to form a rigid permeable mass having voids between the individual sand particles for the flow of liquid therethrough,
   (d) the wall thickness of said filter mass being approximately uniform.

2. A filter for filtering unwanted particles from liquid as the liquid flows therethrough, which filter comprises:
   (a) a hollow casing having a top and bottom wall,
      (1) said hollow casing having an inlet opening formed therein,
      (2) said hollow casing having an outlet opening formed in said top,
   (b) a portion of a pipe extending from said outlet opening into said casing,
   (c) a plurality of circumferentially spaced reinforcing bars secured to said pipe and extending longitudinally therefrom,
   (d) a second portion of pipe spaced longitudinally from said first pipe portion,
      (1) said reinforcing bars being secured to said second pipe portion,,
      (2) the lower end of said second pipe portion being closed and secured to said bottom,
   (e) a filter mass surrounding said pipe portions and surrounding said reinforcing bars to embed said reinforcing bars therein,
      (1) said filter mass comprising a mixture of sand and fiberglass bonded together by epoxy resin to form a rigid permeable mass having voids between the individual sand particles for the flow of liquid therethrough, (d) the wall thickness of said filter mass being approximately uniform.

References Cited by the Examiner

UNITED STATES PATENTS

| | | | |
|---|---|---|---|
| 907,328 | 12/1908 | Freeman | 210—497 X |
| 1,742,411 | 1/1930 | Muller | 106—40 |
| 1,992,718 | 2/1935 | Records | 210—496 X |
| 2,426,405 | 8/1947 | McDermott | 55—510 |
| 2,539,768 | 1/1951 | Anderson | 210—496 |
| 2,549,363 | 4/1951 | Blickman | 210—411 |
| 2,770,840 | 11/1956 | Biefeld et al. | 264—232 |
| 3,173,488 | 3/1965 | Rensvold | 210—504 X |

FOREIGN PATENTS

| | | |
|---|---|---|
| 15,402 | 1885 | Great Britain. |

REUBEN FRIEDMAN, *Primary Examiner.*

F. SPEAR, *Assistant Examiner.*